US010804807B2

(12) United States Patent
Saha et al.

(10) Patent No.: US 10,804,807 B2
(45) Date of Patent: Oct. 13, 2020

(54) LOW RMS CURRENT ZERO VOLTAGE SWITCHING ASSISTING CIRCUIT WITH LOW POWER LOSS AND EMI

(71) Applicant: Utah State University, Logan, UT (US)

(72) Inventors: Tarak Saha, Logan, UT (US); Hongjie Wang, Logan, UT (US); Regan A Zane, Hyde Park, UT (US)

(73) Assignee: Utah Sate University, Cache County, Logan, UT (US)

( * ) Notice: Subject to any disclaimer, the term of this patent is extended or adjusted under 35 U.S.C. 154(b) by 2 days.

(21) Appl. No.: 16/296,103

(22) Filed: Mar. 7, 2019

(65) Prior Publication Data

US 2020/0287470 A1   Sep. 10, 2020

(51) Int. Cl.
*H02M 3/335*   (2006.01)
*H02M 1/34*   (2007.01)
*H02M 1/00*   (2006.01)

(52) U.S. Cl.
CPC ......... *H02M 3/33576* (2013.01); *H02M 1/34* (2013.01); *H02M 2001/0006* (2013.01); *H02M 2001/0058* (2013.01)

(58) Field of Classification Search
CPC ............... H02M 3/33576; H02M 1/34; H02M 2001/0006; H02M 2001/0058
See application file for complete search history.

(56) References Cited

U.S. PATENT DOCUMENTS

| | | | |
|---|---|---|---|
| 6,356,462 B1 | 3/2002 | Yang | |
| 6,583,999 B1 | 6/2003 | Spindler | |
| 6,611,444 B2 | 8/2003 | Ayyanar | |
| 9,712,066 B2 | 7/2017 | Zane | |
| 2005/0243579 A1* | 11/2005 | Jang | H02M 3/335 363/16 |
| 2008/0316775 A1* | 12/2008 | Tsai | H02M 7/217 363/21.01 |

(Continued)

OTHER PUBLICATIONS

Saha et al., "An Improved Active Zero Voltage Switching Assisting Circuit with Lower dv/dt for DC-DC Series Resonant Converter with Constant Input Current", 2018 IEEE Applied Power Electronics Conference and Exposition (APEC), 2018, pp. 826-831; San Antonio, TX, USA.

(Continued)

*Primary Examiner* — Adolf D Berhane
*Assistant Examiner* — Kevin H Sprenger (57) ABSTRACT

An apparatus for zero voltage switching includes a ZVS assist circuit connected between a switching node and a negative connection of a converter. The switching node is located between first and second switches of a switching leg of the converter. The converter is fed by a constant current source and feeds a constant current load. The ZVS assist circuit includes a ZVS inductance, a first ZVS switch that allows current through the ZVS inductance to change a voltage of the switching node to a condition for zero voltage switching of the first switch of the switching leg, and a second ZVS switch that allows current through the ZVS inductance to change the voltage of the switching node to a condition for zero voltage switching of the second switch of the switching leg. Current through the first ZVS switch is opposite current through the second ZVS switch.

20 Claims, 8 Drawing Sheets

(56) References Cited

U.S. PATENT DOCUMENTS

| | | | | |
|---|---|---|---|---|
| 2009/0021966 A1* | 1/2009 | Jacobson | ............... | H02M 1/34 |
| | | | | 363/52 |
| 2011/0127976 A1* | 6/2011 | Hiltbrunner | ........ | H02M 3/3378 |
| | | | | 323/272 |
| 2012/0268222 A1* | 10/2012 | Czimmek | ............ | H03K 5/1536 |
| | | | | 331/186 |
| 2015/0029758 A1* | 1/2015 | Jacobson | .......... | H02M 3/33576 |
| | | | | 363/17 |
| 2016/0020701 A1* | 1/2016 | Jitaru | ................ | H02M 3/33546 |
| | | | | 363/16 |
| 2016/0329828 A1* | 11/2016 | Zhang | .................... | H02M 1/08 |
| 2020/0007022 A1* | 1/2020 | De Doncker | ..... | H02M 3/33576 |

OTHER PUBLICATIONS

Cho et al.; "Novel Full Bridge Zero-Voltage-Transition PWM DC/DC Converter for High Power Applications", Proceedings of 1994 IEEE Applied Power Electronics conference and Exposition—ASPEC'94; 1994. pp. 143-149 vol. 1; Orlando, FL, USA.

De Doncker and Lyons; "The Auxiliary Resonant Commutated Pole Converter"; Conference record of the 1990 IEEE Industry Applications Society Annual Meeting; 1990; pp. 1228-1235; vol. 2; Seattle, WA, USA.

\* cited by examiner

LOW RMS CURRENT ZERO VOLTAGE SWITCHING ASSISTING CIRCUIT WITH LOW POWER LOSS AND EMI

FIELD

This invention relates to direct current ("DC") to DC converters and more particularly relates to DC-to-DC resonant converters fed by a constant current source and with a zero voltage switching assist circuit.

BACKGROUND

Resonant converters have gained wide popularity due to their advantages of high power density, soft switching ability, low electromagnetic interference ("EMI"), and high reliability. These converters are widely used in dc distribution systems, wireless power transfer systems, battery management systems, and the like. With the advent of modern high speed wide band gap devices, operating frequency of power converters is increasing and thus soft-switching of the devices has become important for reliable and efficient power conversion. With the fixed switching frequency, series resonant converters ("SRCs"), which is one of the popular converters due to its low component count, cannot operate with zero voltage switching ("ZVS") for the entire range of load and input voltage.

SUMMARY

An apparatus for zero voltage switching is disclosed. A ZVS assist circuit and a converter also perform the functions of the apparatus. The apparatus includes a ZVS assist circuit connected between a switching node and an end point of a converter. The switching node is located between a first switch and a second switch of a switching leg of the converter. The converter is fed by a constant current source and feeds a constant current load. The switching leg is connected between a positive connection and the negative connection of the converter. The ZVS assist circuit includes a ZVS inductance, a first ZVS switch that allows current through the ZVS inductance of the ZVS assist circuit to change a voltage of the switching node to a condition for zero voltage switching of the first switch of the switching leg, and a second ZVS switch that allows current through the ZVS inductance of the ZVS assist circuit to change the voltage of the switching node to a condition for zero voltage switching of the second switch of the switching leg. Current through the first ZVS switch is opposite current through the second ZVS switch.

A ZVS assist circuit in a converter includes a connection to a switching node and a connection to an end point of the converter. The switching node is between a first switch and a second switch of a switching leg of the converter. The converter is fed by a constant current source and feeds a constant current load. The switching leg is connected between a positive connection and the negative connection of the converter. The ZVS assist circuit includes a ZVS inductance, a ZVS capacitor connected in series with the ZVS inductance, a first ZVS switch, and a first ZVS diode in series with the first ZVS switch. The first ZVS switch and first ZVS diode are connected and oriented to allow current through the ZVS inductance of the ZVS assist circuit to change a voltage of the switching node to a condition for zero voltage switching of the first switch of the switching leg. The ZVS assist circuit includes a second ZVS switch and a second ZVS diode in series with the second ZVS switch. The second ZVS switch and second ZVS diode are connected and oriented to allow current through the ZVS inductance of the ZVS assist circuit to change the voltage of the switching node to a condition for zero voltage switching of the second switch of the switching leg. Current through the first ZVS switch is opposite current through the second ZVS switch.

A converter includes a first leg of an H-bridge circuit where the first leg includes a first switch and a second switch connected in series between a positive connection and a negative connection. A connection between the first switch and the second switch is a first switching node. The converter includes a second leg of the H-bridge circuit where the second leg includes a third switch and a fourth switch connected in series between a positive connection and a negative connection. A connection between the third switch and the fourth switch is a second switching node. The converter includes a resonant section connected between the first switching node, the second switching node and a constant current-fed load. A constant current source is connected between the positive connection and the negative connection. The converter includes a ZVS assist circuit connected between the first switching node and the negative connection. The ZVS assist circuit includes a ZVS inductance, a first ZVS switch that allows current through the ZVS inductance of the ZVS assist circuit to change a voltage of the first switching node to a condition for zero voltage switching of the first switch, and a second ZVS switch that allows current through the ZVS inductance of the ZVS assist circuit to change the voltage of the first switching node to a condition for zero voltage switching of the second switch. Current through the first ZVS switch is opposite current through the second ZVS switch.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

An apparatus for zero voltage switching is disclosed. A ZVS assist circuit and a converter also perform the functions of the apparatus. The apparatus includes a ZVS assist circuit connected between a switching node and an end point of a converter. The switching node is located between a first switch and a second switch of a switching leg of the converter. The converter is fed by a constant current source and feeds a constant current load. The switching leg is connected between a positive connection and the negative connection of the converter. The ZVS assist circuit includes a ZVS inductance, a first ZVS switch that allows current through the ZVS inductance of the ZVS assist circuit to change a voltage of the switching node to a condition for zero voltage switching of the first switch of the switching leg, and a second ZVS switch that allows current through the ZVS inductance of the ZVS assist circuit to change the voltage of the switching node to a condition for zero voltage switching of the second switch of the switching leg. Current through the first ZVS switch is opposite current through the second ZVS switch.

In some embodiments, the apparatus includes a first ZVS diode in series with the first ZVS switch and a second ZVS diode in series with the second ZVS switch. When current is flowing in the first ZVS switch, the second ZVS diode blocks current through the second ZVS switch and when current is flowing in the second ZVS switch, the first ZVS diode blocks current through the first ZVS switch. The first ZVS diode and the second ZVS diode are connected to the ZVS inductance. In another embodiment, the apparatus includes a snubber connected in parallel with the first ZVS diode and a snubber connected in parallel with the second ZVS diode. In other embodiments, the apparatus includes a ZVS capacitor connected in series with the ZVS inductance in the ZVS assist circuit.

In some embodiments, the ZVS assist circuit includes a transformer with a primary winding connected between the end point and the ZVS inductance and a secondary winding connected between the first ZVS switch and the second ZVS switch. In other embodiments, the first ZVS switch and the second ZVS switch each include a body diode and the first ZVS switch and the second ZVS switch are connected in series. In other embodiments, the first ZVS switch and the second ZVS switch each include a body diode and the first ZVS switch and the second ZVS switch are each connected to the end point. In other embodiments, the ZVS inductance includes leakage inductance of the transformer.

In some embodiments, the ZVS assist circuit includes a transformer with a primary winding connected between the end point and the ZVS inductance, a first secondary winding connected between the first ZVS switch and a first ZVS diode, the first ZVS switch and the first ZVS diode connected to the end point, and a second secondary winding connected between the second ZVS switch and a second ZVS diode, the second ZVS switch and the second ZVS diode connected to the end point. In other embodiments, the ZVS inductance includes leakage inductance of the transformer.

In some embodiments, the apparatus includes a ZVS controller that switches the first ZVS switch on prior to closing the first switch of the switching leg at a time sufficient for the voltage of the switching node to rise to a voltage sufficient for zero voltage switching when closing the first switch of the switching leg and that switches the second ZVS switch on prior to closing the second switch of the switching leg at a time sufficient for the voltage of the switching node to fall to a voltage sufficient for zero voltage switching when closing the second switch of the switching leg. In other embodiments, the ZVS inductance is sized based on an output capacitance of the first and second switches of the switching leg and an expected voltage from the positive connection to the end point. In other embodiments, the apparatus includes a snubber connected in parallel with the first ZVS switch and a snubber connected in parallel with the second ZVS switch.

A ZVS assist circuit in a converter includes a connection to a switching node and a connection to an end point of the converter. The switching node is between a first switch and a second switch of a switching leg of the converter. The converter is fed by a constant current source and feeds a constant current load. The switching leg is connected between a positive connection and the negative connection of the converter. The ZVS assist circuit includes a ZVS inductance, a ZVS capacitor connected in series with the ZVS inductance, a first ZVS switch, and a first ZVS diode in series with the first ZVS switch. The first ZVS switch and first ZVS diode are connected and oriented to allow current through the ZVS inductance of the ZVS assist circuit to change a voltage of the switching node to a condition for zero voltage switching of the first switch of the switching leg. The ZVS assist circuit includes a second ZVS switch and a second ZVS diode in series with the second ZVS switch. The second ZVS switch and second ZVS diode are connected and oriented to allow current through the ZVS inductance of the ZVS assist circuit to change the voltage of the switching node to a condition for zero voltage switching of the second switch of the switching leg. Current through the first ZVS switch is opposite current through the second ZVS switch.

In some embodiments, the ZVS assist circuit includes a transformer with a primary winding connected between the end point and the ZVS inductance and a secondary winding connected between the first ZVS switch and the second ZVS switch. The first ZVS diode is a body diode of the first ZVS switch and the second ZVS diode is a body diode of the second ZVS switch and the first ZVS switch and the second ZVS switch are connected in series or each is connected to the end point. In other embodiments, the ZVS assist circuit includes a transformer with a primary winding connected between the end point and the ZVS inductance, a first secondary winding connected between the first ZVS switch and a first ZVS diode where the first ZVS switch and the first ZVS diode are connected to the end point, and a second secondary winding connected between the second ZVS switch and a second ZVS diode where the second ZVS switch and the second ZVS diode are connected to the end point.

A converter includes a first leg of an H-bridge circuit where the first leg includes a first switch and a second switch connected in series between a positive connection and a negative connection. A connection between the first switch and the second switch is a first switching node. The converter includes a second leg of the H-bridge circuit where the second leg includes a third switch and a fourth switch connected in series between a positive connection and a negative connection. A connection between the third switch and the fourth switch is a second switching node. The converter includes a resonant section connected between the first switching node, the second switching node and a constant current-fed load. A constant current source is connected between the positive connection and the negative connection. The converter includes a ZVS assist circuit connected between the first switching node and the negative connection. The ZVS assist circuit includes a ZVS inductance, a first ZVS switch that allows current through the ZVS inductance of the ZVS assist circuit to change a voltage of the first switching node to a condition for zero voltage switching of the first switch, and a second ZVS switch that allows current through the ZVS inductance of the ZVS assist circuit to change the voltage of the first switching node to a condition for zero voltage switching of the second switch. Current through the first ZVS switch is opposite current through the second ZVS switch.

In some embodiments, the ZVS assist circuit includes a first ZVS diode in series with the first ZVS switch and a second ZVS diode in series with the second ZVS switch. When current is flowing in the first ZVS switch, the second ZVS diode blocks current through the second ZVS switch and when current is flowing in the second ZVS switch, the first ZVS diode blocks current through the first ZVS switch. The first ZVS diode and the second ZVS diode are connected to the ZVS inductance.

In some embodiments, the ZVS assist circuit includes a ZVS capacitor connected in series with the ZVS inductance in the ZVS assist circuit. In other embodiments, the ZVS assist circuit is a first ZVS assist circuit and the converter includes a second ZVS assist circuit connected between the second switching node and the negative connection.

Figure 1:
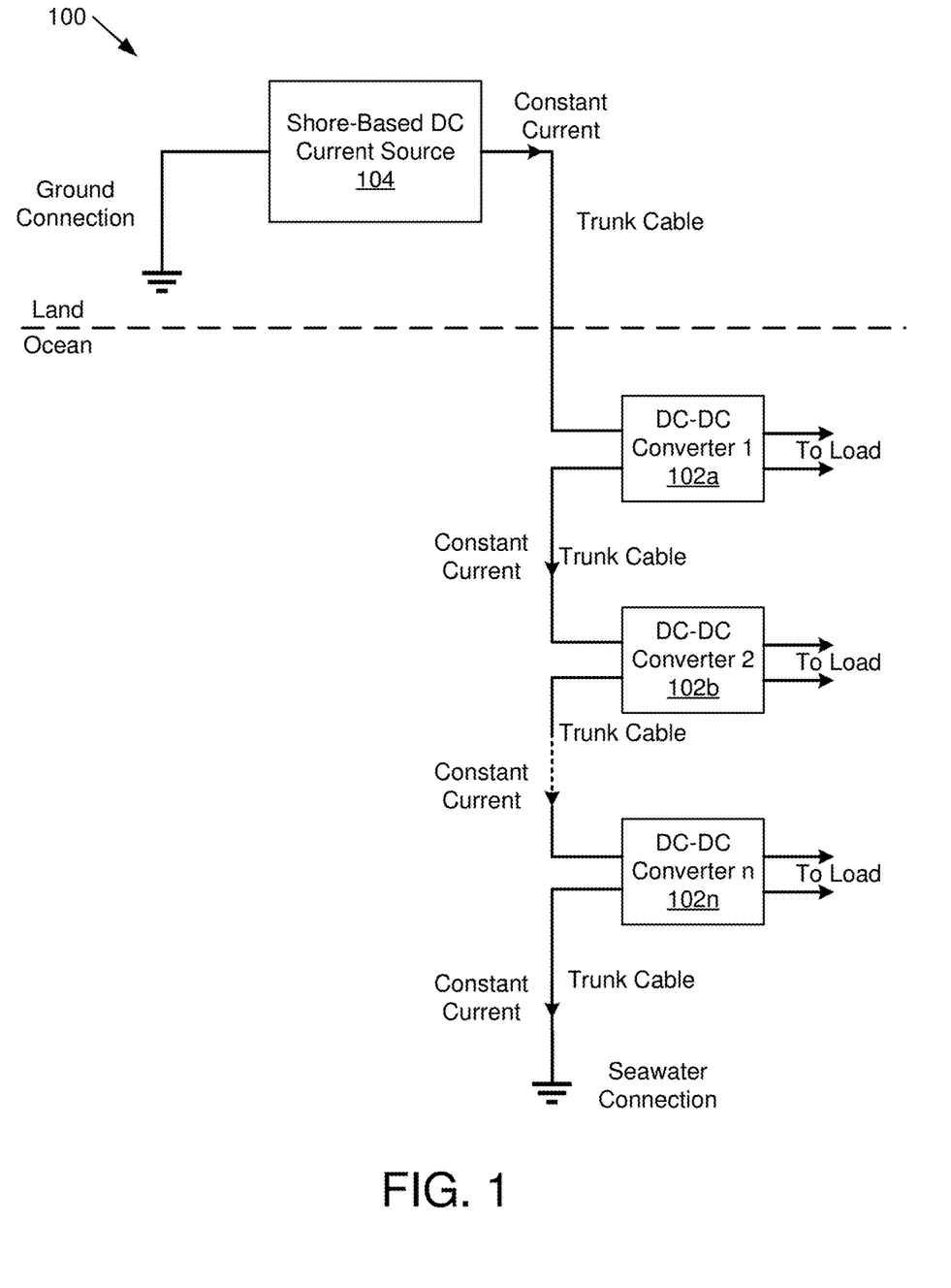
FIG. 1 is a schematic block diagram illustrating one embodiment of a system with DC-DC converters with zero voltage switching ("ZVS") assist circuits and a constant current source.

FIG. 1 is a schematic block diagram illustrating one embodiment of a system 100 with DC-DC converters 102a-n (collectively or generically "102") with ZVS assist circuits and a constant current source 104. In the embodiment, the constant current source 104 is direct current ("DC") and is on a shore of an ocean or other body of salty or otherwise conductive water and a trunk cable feeds DC-DC converters 102, which are series connected. Each DC-DC converter 102 feeds a load, such as a sensor, a light, a vehicle, a camera, and the like.

The constant current source 104 is grounded on land and the trunk cable is grounded by a seawater connection. An advantage of a system 100 with a constant current source 104 feeding converters 102 is robustness against voltage drop over a long distance of the trunk cable. In addition, the system 100 includes robustness against cable faults where seawater serves as the current return. Each DC-DC converter 102 has a constant input current with a regulated output current. Other systems in other situations also benefit from a constant current source feeding one or more DC-DC converters 102.

As loading conditions change, the input voltage of a converter changes, which provides challenges in achieving ZVS. ZVS is valuable to reduce switching losses, which increases efficiency of the DC-DC converters 102.

Figure 2A:
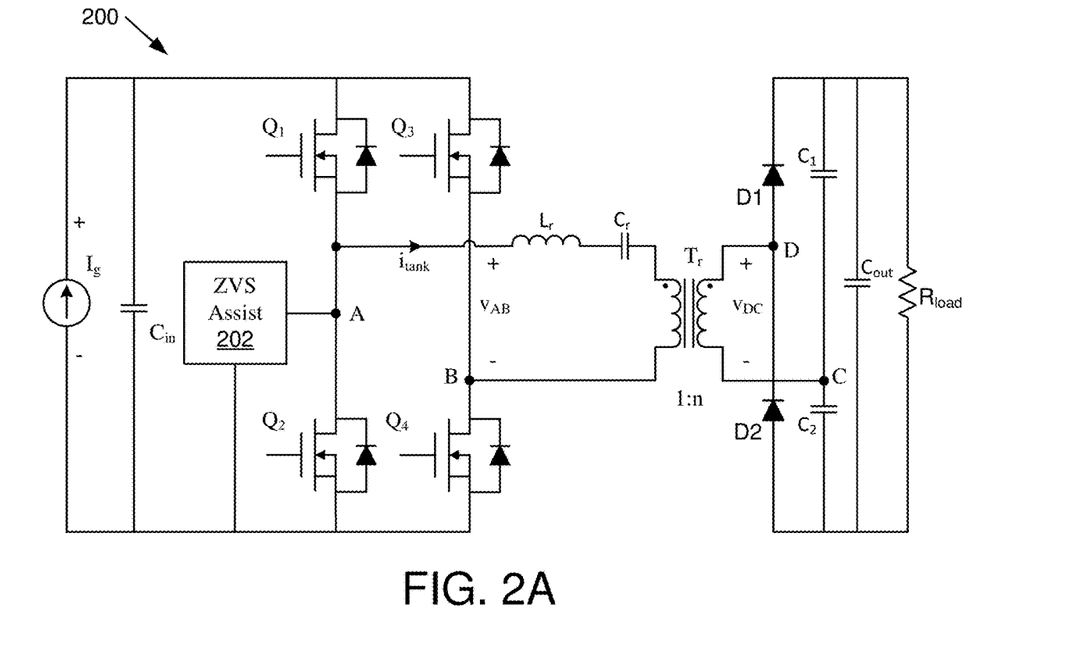
FIG. 2A is a schematic block diagram illustrating one embodiment of a DC-DC converter with a ZVS assist circuit.

FIG. 2A is a schematic block diagram illustrating one embodiment of a DC-DC converter 200 with a ZVS assist circuit 202. In some embodiments, the DC-DC converter 200 (or converter 200) is a DC-DC converter 102 of the system 100 of FIG. 1. The converter 200 is fed by a constant current source $I_g$ and feeds a resistance load, represented by a resistance $R_{load}$ where the converter 200 provides a regulated or constant current to the load. The constant current source $I_g$ is connected between a positive connection on the top of the converter 200 and a negative connection running along the bottom of the converter 200. The negative connection, in some embodiments is a common connection that is a reference for circuits of the converter 102. In some embodiments, the negative connection is a grounded connection and may be connected to a ground, such as case of the converter 200, connected to an equipment grounding conductor (green or copper wire) of a utility power system, may be connected to earth ground, etc.

The converter 200 includes an input capacitance $C_{in}$ connected between the positive connection and the negative connection, which, in some embodiments, smooths switching ripple. The converter includes switches $Q_1$, $Q_2$, $Q_3$, $Q_4$ in an H-bridge configuration. A first leg of the H-bridge circuit, which may also be referred to as a switching leg, includes a first switch $Q_1$ and a second switch $Q_2$ connected in series and connected between the positive connection and the negative connection. Similarly, a second leg of the H-bridge circuit includes a third switch $Q_3$ and a fourth switch $Q_4$ connected in series and connected between the positive connection and the negative connection. A node between the first switch $Q_1$ and the second switch $Q_2$ is a first switching node A. A node between the third switch $Q_3$ and the fourth switch $Q_4$ is a second switching node B. In other embodiments, a half-bridge topology is used where the switching leg includes the first switch $Q_1$ and the second switch $Q_2$ and there is no second switching leg.

The converter 200 is configured as a series resonant converter ("SRC"). Other embodiments of the converter 200 may include an inductor-capacitor-inductor ("LCL") resonant converter or other resonant topology fed by a constant current source $I_g$ and where ZVS is a benefit. Other non-resonant topologies may also be used. One of skill in the art will recognize other topologies that would benefit from a ZVS assist circuit 202.

The converter 200 includes a resonant section with an inductor $L_r$ and a capacitor $C_r$. In the depicted embodiment, the converter 200 includes a transformer $T_r$ connected to the resonant section that feeds a rectification section. Other embodiments do not include a transformer. The rectification section is depicted with a half-bridge rectifier and capacitors $C_1$ and $C_2$ in a voltage doubler configuration. Other embodiments include a full-bridge rectifier. The converter includes an output capacitor $C_{out}$ across output terminals that are connected to the load. One of skill in the art will recognize other converter topologies that are suitable for use with a constant current source $I_g$ and a regulated current output.

The SRC circuit topology depicted in the converter 200 of FIG. 2 operates from constant current input $I_g$. On the primary side of the converter 200, switches, each in the form of a metal-oxide semiconductor field-effect transistor ("MOSFET") $Q_1$-$Q_4$, forms a direct current ("DC") to alternating current ("AC") inverting stage, that applies an output voltage (vas) across a resonant tank constituted by an inductor Lr and a capacitor Cr. The output side of the converter 200 is a diode half bridge voltage doubler with a capacitive filter $C_{out}$, which rectifies and filters the AC output of the 1:n isolation transformer $T_r$. Power delivered to a load ($R_{load}$) is obtained from a DC constant input current source ($I_g$). In some embodiments, the SRC is operated at a switching frequency ($f_s$) that is equal to the resonant frequency ($f_o$) of the tank, resulting in a constant current behavior at the output irrespective of the load resistance $R_{load}$.

This current source nature of the converter 200 reduces an effort required from the controller to regulate the load current. The steady state DC input voltage ($V_{in}$), DC output voltage ($V_{out}$) and DC output current ($I_{out}$) of the converter can be given as $$V_{in} = \frac{I_g R_{load}}{4n^2 \sin^2\left(\frac{\alpha}{2}\right)} \quad (1)$$

$$V_{out} = \frac{I_g R_{load}}{2n \sin\left(\frac{\alpha}{2}\right)} \quad (2)$$

$$I_{out} = \frac{I_g}{2n \sin\left(\frac{\alpha}{2}\right)} \quad (3)$$

where, $\alpha$ is the phase shift angle between leg A and leg B of the converter 200, with leg A voltage leading that of leg B. In some embodiments, symmetric phase shift modulation technique with constant switching frequency is employed for the primary side inverter. These steady state quantities, in some embodiments, are used to evaluate ZVS assistance requirement for each of the switching legs. From equation (3) it can be seen that the output behaves as constant current, independent of load resistance ($R_{load}$), for a given input current ($I_g$), transformer turns ratio (n) and phase shift angle ($\alpha$). So, for a regulated output current scenario, phase shift angle ($\alpha$) is constant, under ideal circumstances. With constant $\alpha$, Ig and n, input voltage ($V_{in}$) varies linearly with $R_{load}$. This brings in wide variation in DC bus voltage of the primary side inverter and hence passive ZVS assisting techniques may not achieve ZVS of all switches for the entire load range without compromising heavily load efficiency.

In addition to the main power processing circuit in the converter 200 of FIG. 2, a ZVS assisting circuit 202 is connected between switch node A and an end point. In the depicted embodiment, the end point is the negative connection. In other embodiments (not shown), the end point is the positive connection. Where the end point is the positive connect, drive circuits of switches of the ZVS assist circuit 202 are referenced differently and the switches are controlled differently than when the end point is the negative connection to accommodate connection to the positive connection. In some embodiments, only the leading leg (leg A) of the converter 200 of FIG. 2 needs ZVS assistance whereas the lagging leg achieves natural ZVS by the tank current. In the described embodiments below, only leg A of the converter and its assisting circuit is shown. Other embodiments include a ZVS assist circuit 202 for both legs.

Typically, each switch $Q_1$-$Q_4$ of the H-bridge circuit includes parasitic capacitance, inductance, resistance, etc. that cause switching losses. Having voltage across a switch, such as a MOSFET, which is commonly used in converters, are efficiently switched if voltage across the switch is zero when the switch is closed. A major factor influencing attempts to cause voltage across the switches to be zero or near zero during switching is parasitic capacitance across the output of the switch, which is often termed Coss (or $C_{OSS}$), which prevents instantaneous voltage changes across the switch. The $C_{OSS}$ must be discharged to achieve zero volts across the switch. The ZVS assist circuit 202 is configured to vary voltage of the switching node A by discharging the $C_{OSS}$ of the first switch $Q_1$ or second switch $Q_2$ at an appropriate moment during a switching cycle to achieve ZVS by influencing current into and out of the first switching node A (or just "switching node A").

The ZVS assist circuit 202 includes a ZVS inductance and a first ZVS switch that allows current through the ZVS inductance of the ZVS assist circuit 202 to change a voltage of the switching node A to a condition for zero voltage switching of the first switch $Q_1$ of the H-bridge circuit. In addition, the ZVS circuit includes a second ZVS switch that allows current through the ZVS inductance of the ZVS assist circuit 202 to change the voltage of the switching node A to a condition for zero voltage switching of the second switch $Q_2$ of the H-bridge circuit where current through the first ZVS switch is opposite current through the second ZVS switch. The ZVS inductance is sized based on an output capacitance of the first and second switches of the H-bridge circuit and an expected voltage from the positive connection to the end point. Various configurations of the ZVS assist circuit with a ZVS inductance, a first ZVS switch and a second ZVS switch configured to achieve ZVS for the first and second switches $Q_1$, $Q_2$ of the H-bridge circuit are described below with respect to FIGS. 3-7.

In some embodiments, the ZVS circuit 202 includes a ZVS capacitor connected in series with the ZVS inductance.

The ZVS capacitor is configured to block DC current to the switching node A. Typically, the ZVS capacitor sees voltages that are half of the input voltage (e.g. 0.5 $V_{in}$), but the ZVS capacitor is typically sized for higher voltages to accommodate transients.

Figure 2B:
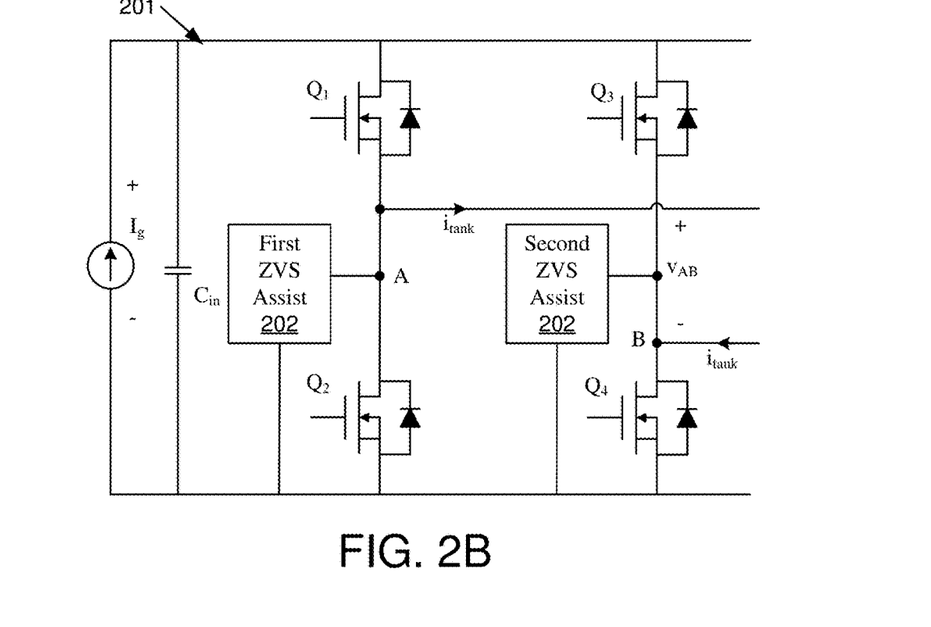
FIG. 2B is a schematic block diagram illustrating one embodiment of an H-bridge portion of a DC-DC converter with two ZVS assist circuits.

In some embodiments, the second leg of the H-bridge circuit achieves ZVS naturally so that a second ZVS assist circuit is not necessary. Thus, the converter 200 of FIG. 2A includes a single ZVS assist circuit on the first leg of the H-bridge circuit. FIG. 2B is a schematic block diagram illustrating one embodiment of an H-bridge portion of a DC-DC converter 201 with two ZVS assist circuits 202. Other topologies and/or control schemes will benefit from a ZVS assist circuit 202 for each leg of an H-bridge circuit while some topologies and/or control schemes will benefit with a single ZVS assist circuit 202. While embodiments included herein include a single ZVS assist circuit 202, one of skill in the art that each converter described herein may include a second ZVS assist circuit 202 and discussions about the first and second switches $Q_1$, $Q_2$ of the H-bridge circuit are also applicable to the second leg of the H-bridge circuit with the third and fourth switches $Q_3$, $Q_4$.

Figure 3:
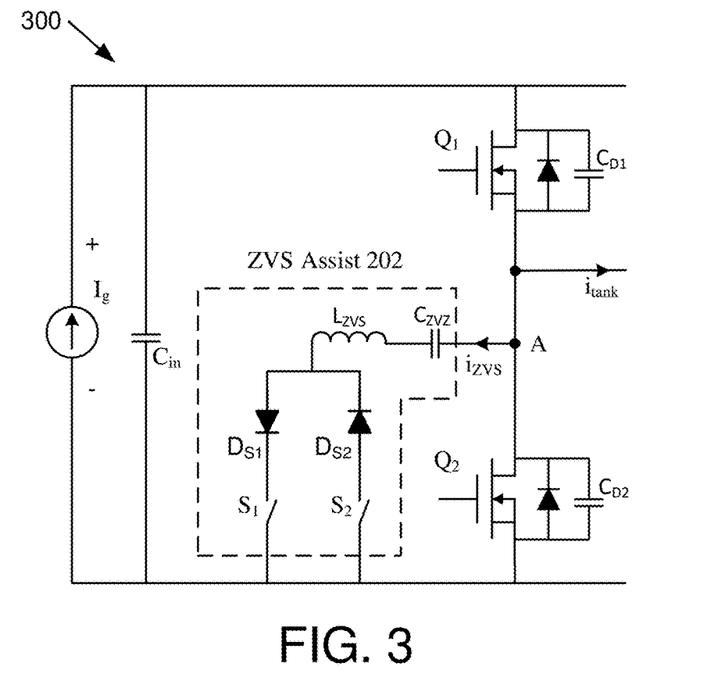
FIG. 3 is a schematic block diagram illustrating one embodiment of a portion of a DC-DC converter with a ZVS assist circuit that includes diodes and switches.

FIG. 3 is a schematic block diagram illustrating one embodiment of a portion of a DC-DC converter 300 with a ZVS assist circuit 202 that includes diodes $D_{S1}$, $D_{S2}$ and switches $S_1$, $S_2$. The converter 300 includes a portion of the converter 300 that includes a first leg of an H-bridge circuit or switching leg of a half-bridge circuit with a first switch $Q_1$ and a second switch $Q_2$ in the first leg. The converter 300 may be like the converter 200 of FIG. 2, the converter 102 in FIG. 1 or another converter. A center point between the two switches $Q_1$, $Q_2$ is a switching node A and the ZVS assist circuit 202 is connected to the switching node A. Capacitance $C_{D1}$ and $C_{D2}$ represent the output capacitor $C_{OSS}$ of MOSFETs $Q_1$ and $Q_2$, respectively.

In the embodiment, the ZVS assist circuit 202 includes a ZVS inductance $L_{ZVS}$ in series with a ZVS capacitor $C_{ZVS}$. The ZVS inductance $L_{ZVS}$ provides a reactive current needed for ZVS and the ZVS capacitor $C_{ZVS}$ blocks DC voltage at the switching node A. The ZVS assist circuit 202 also includes a first ZVS switch $S_1$ in series with a first ZVS diode $D_{S1}$, and the first ZVS switch $S_1$ and the first ZVS diode $D_{S1}$ are connected between the ZVS inductance $L_{ZVS}$ and the negative connection of the converter 300. In addition, the ZVS assist circuit 202 includes a second ZVS switch $S_2$ in series with a second ZVS diode $D_{S2}$, and the second ZVS switch $S_2$ and the second ZVS diode $D_{S2}$ are connected between the ZVS inductance $L_{ZVS}$ and the negative connection of the converter 300. The first ZVS diode $D_{S1}$ and second ZVS diode $D_{S2}$ are oriented in opposite directions so that the first switch $S_1$ conducts current toward the negative connection and the second switch $S_2$ conducts current in the opposite direction toward the ZVS inductance $L_{ZVS}$. When the first switch $S_1$ and the second switch $S_2$ are open, current does not flow through the ZVS assist circuit 202. When the end point is the positive connection, operation of the first ZVS switch $S_1$ and the second ZVS switch $S_2$ is different to accommodate different voltage conditions across the switches $S_1$ and $S_2$ and diodes $D_{S1}$ and $D_{S2}$.

Active switches $S_1$ and $S_2$ are turned on such that they create a short duration triangular pulse around the switching instant of main MOSFET switches $Q_1$, $Q_2$. Prior to the turn on of the first switch $S_1$ and second switch $S_2$, the pulses create a net current at switching node A in an appropriate direction to charge/discharge the effective capacitance at the switching node A. The first ZVS diode $D_{S1}$ and the second ZVS diode $D_{S2}$ ensure zero current turn on and off of the first ZVS switch $S_1$ and $S_2$.

It should be noted that even though the switches $S_1$, $S_2$ change state with zero current, energy stored in the output capacitance ($C_{OSS}$) of the devices is discharged in the device while turning on. This energy lost increases exponentially as the operating DC bus voltage increases and also creates large dv/dt related EMI, at device turn on. Therefore, this ZVS assist circuit 202 may not be a good choice for an SRC with a constant input current $I_g$, because DC bus voltage of the SRC increases with the load where ZVS is mostly needed and component ratings must be selected for the expected DC bus voltage.

Figure 4:
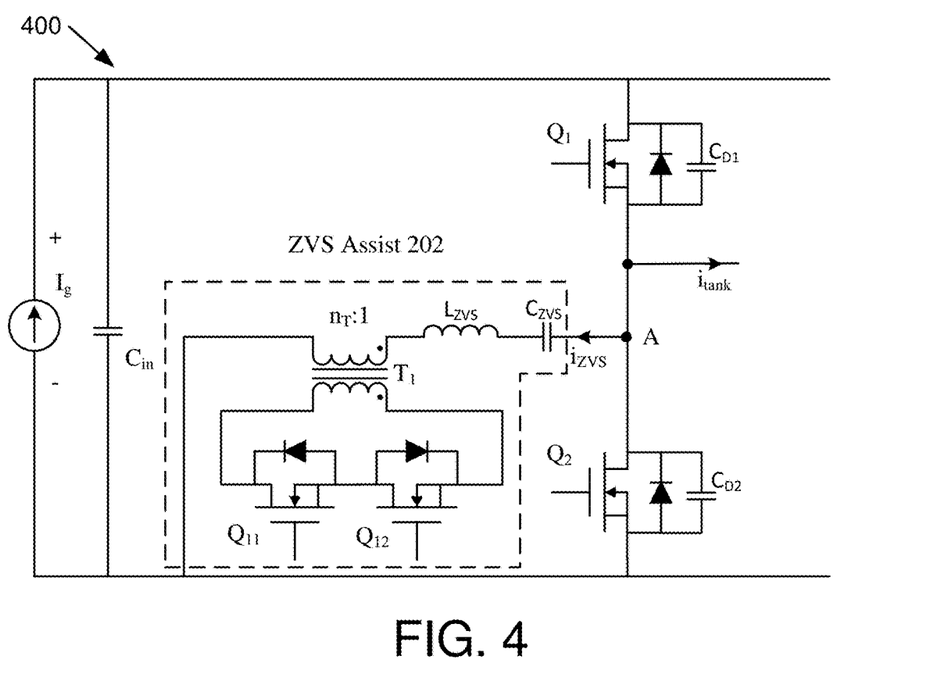
FIG. 4 is a schematic block diagram illustrating one embodiment of a portion of a DC-DC converter with a ZVS assist circuit that includes a transformer and back-to-back switches.

FIG. 4 is a schematic block diagram illustrating one embodiment of a portion of a DC-DC converter 400 with a ZVS assist circuit 202 that includes a transformer $T_1$ and back-to-back switches $Q_{11}$ and $Q_{12}$. The ZVS assist circuit 202 includes a transformer $T_1$ with a primary winding connected between the negative connection and the ZVS inductance $L_{ZVS}$ and a secondary winding connected between the first ZVS switch $Q_{11}$ and the second ZVS switch $Q_{12}$. In some embodiments, the primary winding is connected to the positive connection. In an alternate embodiment (not shown), the primary winding is connected between the ZVS inductance $L_{ZVS}$ and the positive connection. In some embodiments, the first ZVS switch $Q_{11}$ and the second ZVS switch $Q_{12}$ each include a body diode and the first ZVS switch $Q_{11}$ and the second ZVS switch $Q_{12}$ are connected in series.

In order to overcome the limitations described above, a modified ZVS assist circuit 202 is proposed in the converter 400 of FIG. 4 where the ZVS switches $S_1$, $S_2$ are transferred to the low voltage side of an auxiliary transformer $T_1$ and, thus, reduces the turn on voltage magnitude across the auxiliary ZVS switches $Q_{11}$, $Q_{12}$. Leakage inductance of the transformer $T_1$, in some embodiments, is utilized as ZVS inductance, $L_{ZVS}$. Since the voltage stress across the auxiliary ZVS switches $Q_{11}$, $Q_{12}$ are lower, a low cost silicon based MOSFET can be used to realize these switches $Q_{11}$, $Q_{12}$. Capacitor $C_{ZVS}$ works as a DC blocking capacitor in the ZVS assist circuit 202 whose operating voltage is $0.5V_{in}$.

Figure 5:
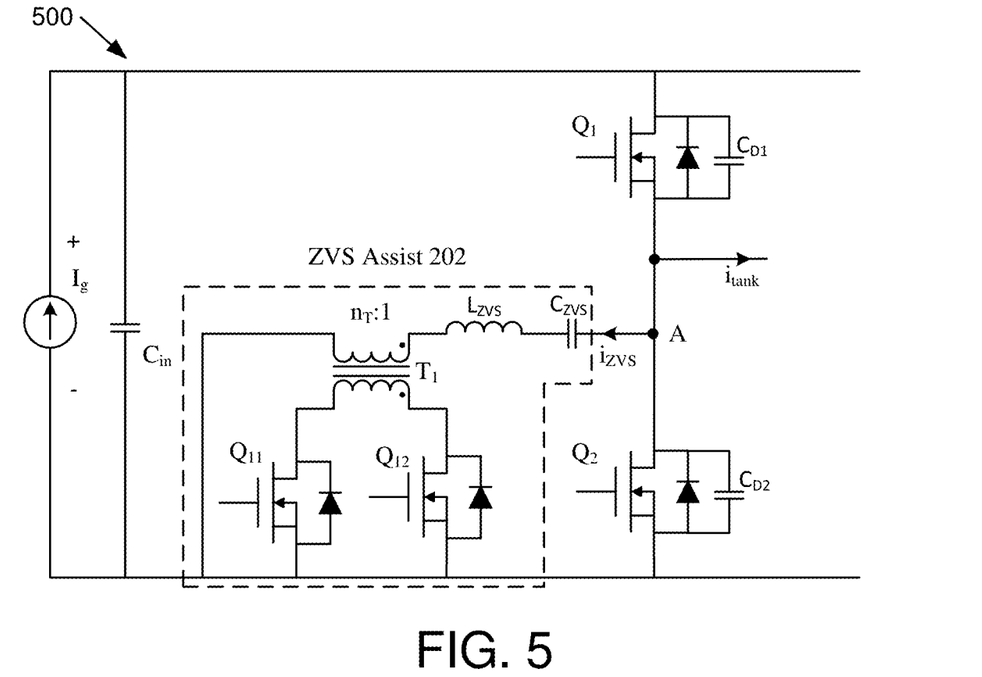
FIG. 5 is a schematic block diagram illustrating one embodiment of a portion of a DC-DC converter with a ZVS assist circuit that includes a transformer and two switches connected to a negative connection.

FIG. 5 is a schematic block diagram illustrating one embodiment of a portion of a DC-DC converter 500 with a ZVS assist circuit 202 that includes a transformer $T_1$ and two switches $Q_{11}$, $Q_{12}$ connected to a negative connection. As with the converter 400 of FIG. 4, the ZVS assist circuit 202 includes a transformer $T_1$ with a primary winding connected between the negative connection and the ZVS inductance $L_{ZVS}$ and a secondary winding connected between the first ZVS switch $Q_{11}$ and the second ZVS switch $Q_{12}$. In the embodiment, the first ZVS switch $Q_{11}$ and the second ZVS switch $Q_{12}$ each include a body diode and the first ZVS switch $Q_{11}$ and the second ZVS switch $Q_{12}$ are each connected to the negative connection. In some embodiments, the primary winding, the first ZVS switch $Q_{11}$ and the second ZVS switch $Q_{12}$ are connected to the positive connection (not shown).

The ZVS assisting circuit 202 of FIG. 4 can alternately be realized by the ZVS assist circuit 202 shown in FIG. 5 where the gate drivers of the auxiliary MOSFETs $Q_{11}$, $Q_{12}$ are referenced to the negative connection, which may be a ground. However, one issue of these circuit realizations is reverse recovery effect of the body diodes of auxiliary MOSFETs which can introduce high frequency oscillations near the zero crossing of ZVS assisting current and thus produce more EMI. A Schottky diode with lower on state voltage drop, compared to the body diode of auxiliary MOSFETs, can help reduce the oscillations.

Figure 6:
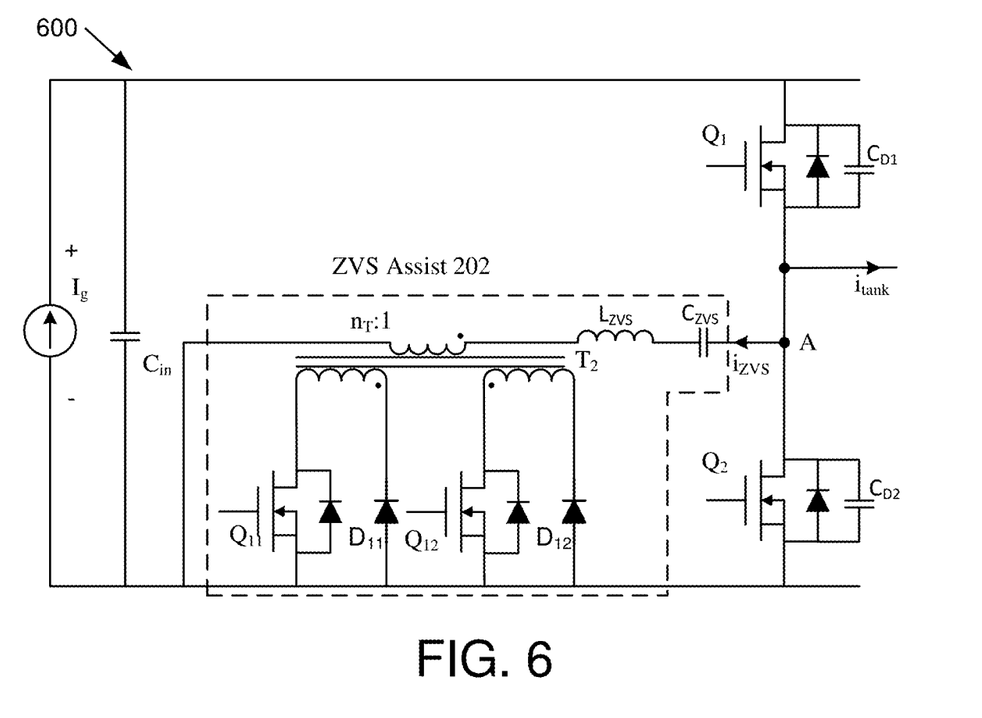
FIG. 6 is a schematic block diagram illustrating one embodiment of a portion of a DC-DC converter with a ZVS assist circuit that includes a three winding transformer where each secondary winding is connected to a switch and a diode.

FIG. 6 is a schematic block diagram illustrating one embodiment of a portion of a DC-DC converter 600 with a ZVS assist circuit 202 that includes a three winding transformer $T_2$. A primary winding is connected between the negative connection and the ZVS inductance $L_{ZVS}$. A first secondary winding is connected between the first ZVS switch $Q_{11}$ and a first ZVS diode $D_{11}$ where the first ZVS switch $Q_{11}$ and the first ZVS diode $D_{11}$ are both connected to the negative connection. A second secondary winding is connected between the second ZVS switch $Q_{12}$ and a second ZVS diode $D_{12}$ where the second ZVS switch $Q_{12}$ and the second ZVS diode $D_{12}$ are both connected to the negative connection. Because of the limitations of the ZVS assist circuit 202 of the converter 500 of FIG. 5, the ZVS assisting circuit 202 configuration presented in FIG. 6 may be used, in some embodiments, with an SRC converter or other converter. In some embodiments, the primary winding, the first ZVS switch $Q_{11}$, the second ZVS switch $Q_{12}$, the first ZVS diode $D_{11}$ and the second ZVS diode $D_{12}$ are connected to the positive connection (not shown).

Figure 7:
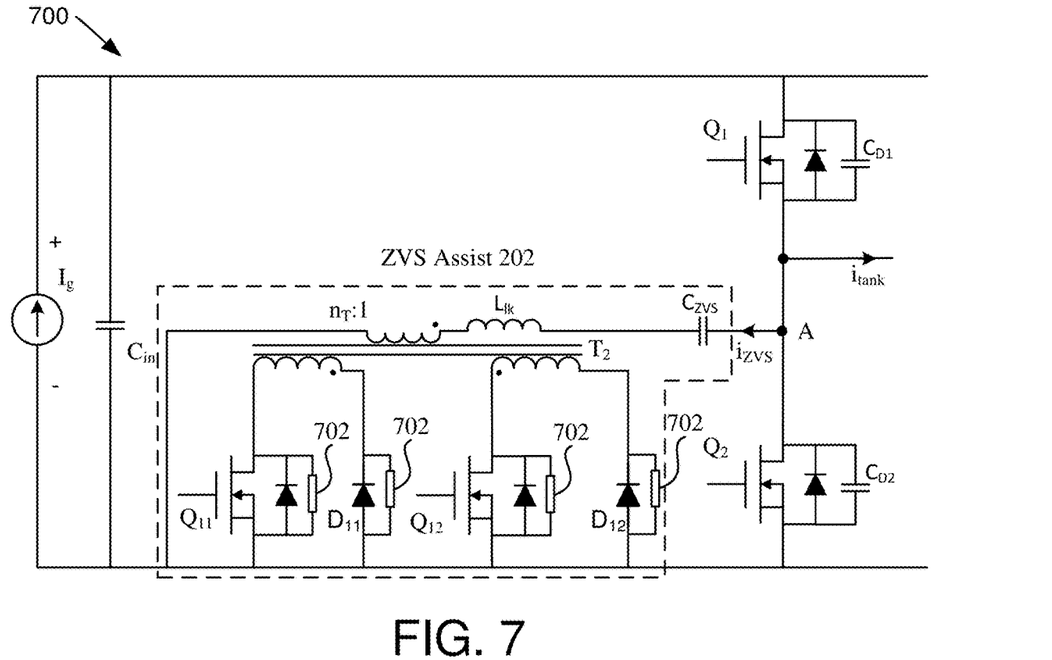
FIG. 7 is a schematic block diagram illustrating one embodiment of a portion of a DC-DC converter with a ZVS assist circuit that includes a three winding transformer where each secondary winding is connected to a switch and a diode with snubbers and leakage inductance replacing a ZVS inductance.

FIG. 7 is a schematic block diagram illustrating one embodiment of a portion of a DC-DC converter 700 with a ZVS assist circuit 202 that includes a three winding transformer $T_2$ where each secondary winding is connected to a switch $Q_{11}$, $Q_{12}$ and a diode $D_{11}$, $D_{12}$ with snubbers and leakage inductance $L_{lk}$ replacing a ZVS inductance $L_{ZVS}$. The ZVS assist circuit 202 of the converter 600 of FIG. 6 operates substantially similar to the ZVS assist circuit 202 of the converter 700 of FIG. 7 except that the switches $Q_{11}$, $Q_{12}$ and diodes $D_{11}$, $D_{12}$ include snubbers 702, which help to reduce overshoot of voltage across the switches $Q_{11}$, $Q_{12}$ and diodes $D_{11}$, $D_{12}$. The snubbers 702 may help to reduce component ratings. In addition, using the leakage inductance $L_{lk}$ instead of the ZVS inductance $L_{ZVS}$ may apply to the other converters 400, 500, 600 of FIGS. 4-6 and may be a more economical solution because the ZVS inductance $L_{ZVS}$ is not needed.

In some embodiments, the first ZVS switch $Q_{11}$ and the second ZVS switch $Q_{12}$ include body diodes. In another embodiment, the first ZVS switch $Q_{11}$ and the second ZVS switch $Q_{12}$ do not include body diodes, for example where the first ZVS switch $Q_{11}$ and the second ZVS switch $Q_{12}$ are gallium nitride field-effect transistors ("GaN-FETs"), insulated-gate bipolar transistors ("IGBTs"), etc. However, the embodiments without switches with body diodes may be limited, for example, to low frequency switching. Typically, a switch with a body diode or a separate series diode are used for performance reasons.

In some embodiments, the primary winding, the first ZVS switch $Q_{11}$, the second ZVS switch $Q_{12}$, the first ZVS diode $D_{11}$ and the second ZVS diode $D_{12}$ are connected to the positive connection (not shown). In other embodiments of the converters 400-700 in FIGS. 4-7, the primary winding is connected to a mid-point between two input capacitors $C_{in1}$ and $C_{in2}$ connected in series between the positive connection and the negative connection (not shown). In the embodiments, the ZVS capacitor $C_{ZVS}$ may be omitted. Note that in embodiments where the end point of the ZVS assist circuit 202 is the positive connection, both the first ZVS switch $S_1$ and the second ZVS switch $S_2$ are connected to the positive connection or connected as in the converter 400 of FIG. 4. Likewise, when the end point of the ZVS assist circuit 202 is the negative connection, both the first ZVS switch $S_1$ and the second ZVS switch $S_2$ are connected to the negative connection, except in the converter 400 of FIG. 4.

In some embodiments, the ZVS assist circuit 202 or one of the converters 200-700 include a ZVS controller (not shown) that switches the first ZVS switch $Q_{11}$ on prior to closing the first switch $Q_1$ of the switching leg at a time sufficient for the voltage of the switching node A to rise to a voltage sufficient for zero voltage switching when closing the first switch $Q_1$ of the switching leg and that switches the second ZVS switch $Q_{12}$ on prior to closing the second switch $Q_2$ of the switching leg at a time sufficient for the voltage of the switching node A to fall to a voltage sufficient for zero voltage switching when closing the second switch $Q_2$ of the switching leg. To achieve ZVS, in some embodiments, the ZVS inductance $L_{ZVS}$ is sized based on an output capacitance of the first and second switches ($C_{OSS}$ or the combination of $C_{D1}$ and $C_{D2}$) of the switching leg and an expected voltage from the positive connection to the negative connection.

Figure 8:
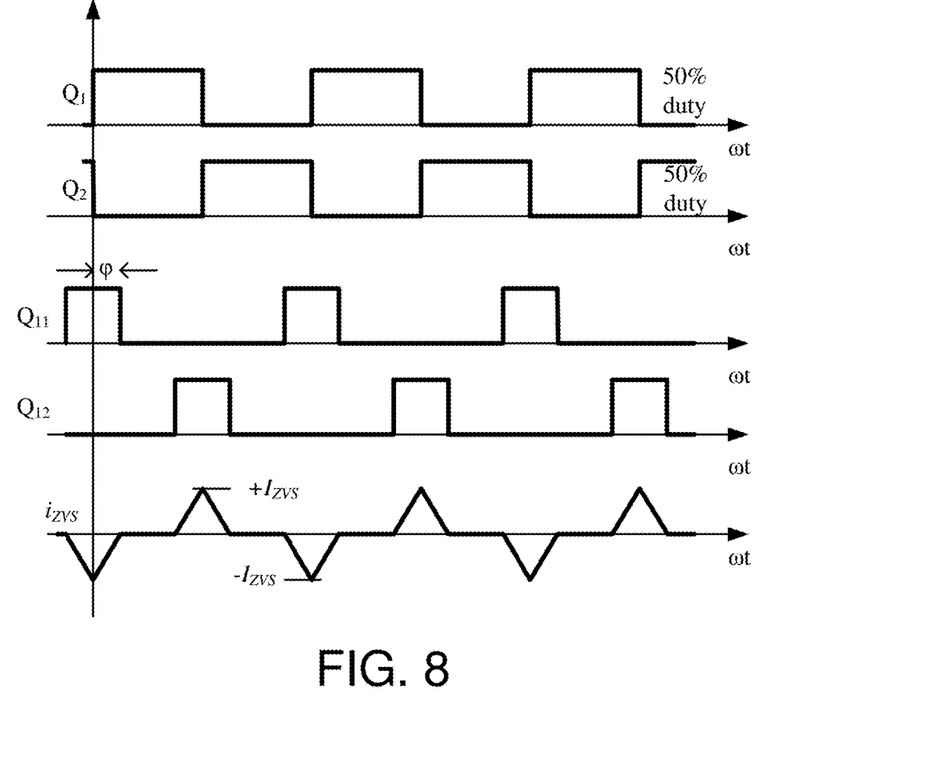
FIG. 8 is a timing diagram displaying H-bridge switch signals, ZVS assist switch signals, and current in the ZVS assist circuit.

A three winding transformer $T_2$ is used in the ZVS assist circuit 202 so that both the gates of auxiliary ZVS switches $Q_{11}$, $Q_{12}$, which have a common ground, can be driven without isolation. The diodes $D_{S1}$ and $D_{S2}$ are selected to be Schottky diodes so that there is no reverse recovery effect. FIG. 8 is a timing diagram displaying switching leg signals, ZVS assist switch signals, and current in the ZVS assist circuit 202. The drive signals for the ZVS switches $Q_{11}$, $Q_{12}$ are shown in FIG. 8 along with the ideal waveform of $i_{ZVS}$. Angle $\varphi$ controls the amplitude of $i_{ZVS}$ (which is depicted as $I_{ZVS}$) which is dependent on the input voltage $V_{in}$, ZVS inductance $L_{ZVS}$ and operating angular switching frequency $\omega_s$, related by $$\varphi = \frac{2\omega_s L_{ZVS} I_{ZVS}}{V_{in}} \quad (4)$$

Figure 9:
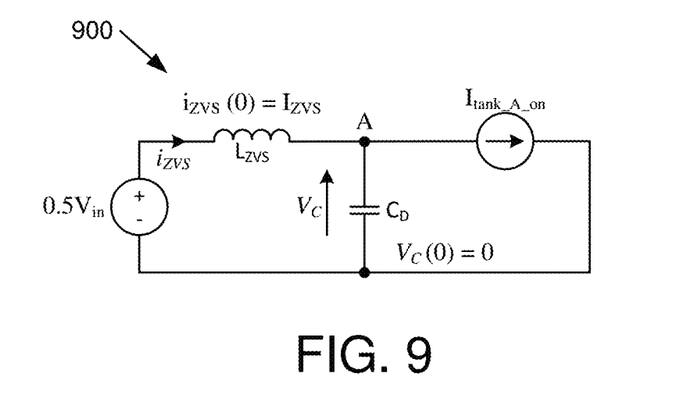
FIG. 9 is a schematic block diagram of an equivalent circuit representing currents at a switching node.

The actual peak value of $i_{ZVS}$ will be higher than the $I_{ZVS}$ depicted in FIG. 8 and is determined by a resonating circuit formed by the ZVS inductance $L_{ZVS}$ and the ZVS capacitor ($C_D$) at the switching node A, as shown in FIG. 9. FIG. 9 is a schematic block diagram of an equivalent circuit representing currents at the switching node A. The equivalent circuit during the dead time ($t_{db}$) between the first switch $Q_1$ and the second switch $Q_2$ of the switching leg is shown in FIG. 9. From the equivalent circuit shown in FIG. 9, the inductor current and capacitor voltage dynamics, during the resonant transition, are be given by $$L_{ZVS} \frac{di_{ZVS}}{dt} = 0.5 V_{in} - v_C \quad (5)$$

$$C_D \frac{dv_C}{dt} = i_{ZVS} - i_{tank_{A_{on}}} \quad (6)$$

where, $C_D$ is the total capacitance at switch node A, due to the output capacitance of MOSFETs of the first switch $Q_1$ and the second switch $Q_2$, including any board parasitic capacitance present across these devices.

In equation (6), $i_{tank\_A\_on}$ is the current out of the half bridge switching node A, at the turn off instant of $Q_2$ and is assumed to have negligible variation during the resonant transition at the switching node A. The value of $i_{tank\_A\_on}$ can be found through the time domain analysis of tank current. Since the input DC voltage varies with the load, the analysis has to be performed for the range of load. A circuit simulation can also be performed to know the value of $i_{tank\_A\_on}$ at different load. The above equations are also valid for the transition from turning off the first switch $Q_1$ to turning on the second switch $Q_2$ transition as well, due to half wave symmetry in the circuit. The solutions to equations (5) and (6) can be given by $$i_{ZVS}(t) = \frac{V_{in}}{2Z_{oa}}\sin(\omega_{oa}t) + (I_{ZVS} - i_{tank\_A\_on})\cos(\omega_{oa}t) + i_{tank\_A\_on}, \quad (7)$$

$$v_C(t) = 0.5V_{in}(1 - \cos(\omega_{oa}t)) + Z_{oa}(I_{ZVS} - i_{tank\_A\_on})\sin(\omega_{oa}t), \quad (8)$$

where, $Z_{oa}$ and $\omega_{oa}$ are defined as $$Z_{oa} = \sqrt{\frac{L_{ZVS}}{C_D}}, \quad (9)$$

$$\omega_{oa} = \frac{1}{\sqrt{L_{ZVS}C_D}}.$$

From equations (7) and (8), we can find out whether, with a starting current of $I_{ZVS}$ in $L_{ZVS}$ i.e. $i_{ZVS}(0)=I_{ZVS}$, the voltage across capacitor $C_D$ can make a transition from initial voltage of 0 V to a final voltage greater than or equal to $V_{in}$ within dead time tab, to ensure that the body diode of the first switch $Q_1$ turns on before its gate pulses are turned on. This will ensure ZVS turn on of the main MOSFETs (e.g. switches $Q_1$, $Q_2$). The time required for vc to make this transition from 0 V to $V_{in}$, $t_{ZVBS}$, can also be found out from equation (8) with the boundary condition of $v_C(t_{ZVS})=V_{in}$. In order to clinch ZVS turn on of the main MOSFETs (switches $Q_1$, $Q_2$) $t_{ZVS}$ should be less than tab. It should be noted that the node capacitance $C_D$ is a voltage dependent nonlinear capacitor and hence to get accurate estimation, equations (5) and (6) are be solved numerically, or $C_D$ is replaced by an equivalent linear capacitance $C_{D,eq}$.

The rms and average current in the auxiliary MOSFETs $Q_{11}$, $Q_{12}$ and diodes $D_{11}$, $D_{12}$ and their reverse blocking voltage can be calculated by $$I_{aux\_rms} = n_T I_{ZVS}\sqrt{\frac{2\varphi}{3\pi}}, \quad I_{aux\_ave} = n_T I_{ZVS}\frac{\varphi}{\pi}, \quad V_{aux} = \frac{V_{in}}{2n_T}. \quad (10)$$

Device ratings for auxiliary circuit can be decided from the equations in (10). The conduction losses in the ZVS assist circuit 202 of FIG. 6 is given by $$P_{cond} = \frac{I_{ZVS}^2}{3}\frac{2\varphi}{\pi}(n_T^2 R_{DS\_ON} + R_{ZVS}) + I_{ZVS}\frac{\varphi}{\pi}n_T V_D, \quad (11)$$

where, RDS_ON is the on state resistance of the auxiliary MOSFETs $Q_{11}$, $Q_{12}$, $V_D$ is the on state drop of the auxiliary diodes $D_{11}$, $D_{12}$, $R_{ZVS}$ is the effective series resistance of the ZVS assisting current carrying path which includes $C_{ZVS}$ and the auxiliary transformer. The turn on loss of each of the auxiliary MOSFETs $Q_{11}$, $Q_{12}$ due to the energy stored in its output capacitance ($C_{OSS}$) can be given by $$P_{SW\_loss\_turn-on} = \frac{1}{2}C_{eq,E}\left(\frac{V_{in}}{2n_T}\right)^2 f_S, \quad (12)$$

where, $C_{eq,E}$ is the energy equivalent linear output capacitor of the auxiliary MOSFET $Q_{11}$ or $Q_{12}$.

A prototype of an SRC converter, as depicted in FIG. 2, operating at 250 kHz and using the ZVS assist circuit depicted in the converter 600 of FIG. 6 has been developed with the parameters shown in Table I. The auxiliary transformer $T_2$ used in the ZVS assist circuit 202 is a 5:1:1 transformer whose leakage inductance is used as the ZVS inductance $L_{ZVS}$.

TABLE 1

Parameters of the Converter

| Parameter | Value |
| --- | --- |
| $L_r$ (μH) | 174.2 |
| $C_r$ (nF) | 2.33 |
| $F_s$ (kHz) | 250 |
| N | 2 |
| $I_g$ (A) | 1 |
| $I_{out}$ (A) | 0.33 |
| $P_{Load}$ (A) | 0-250 |
| $n_T$ | 5 |
| $L_{ZVS}$ (μH) | 15 |
| $Q_{11}$, $Q_{12}$ | FDB110N15A |
| $D_{11}$, $D_{12}$ | STB15200TR |
| $Q_1$-$Q_4$ | C2M1000170D |

Figure 10:
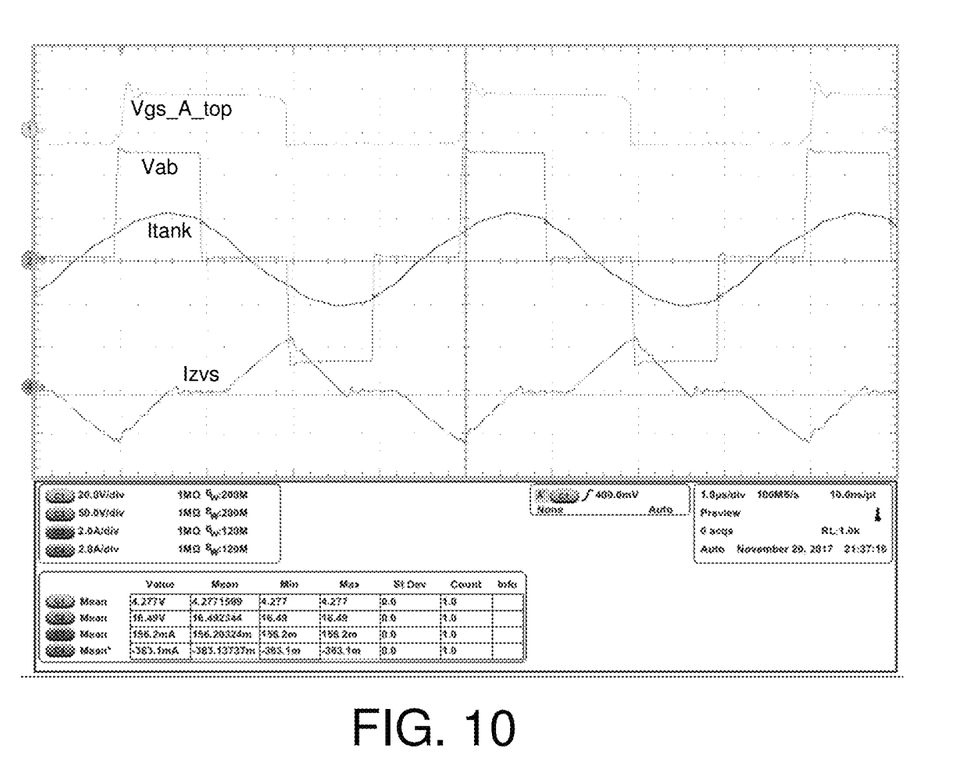
FIG. 10 is a circuit trace diagram of a converter running at 50% load with a ZVS assist circuit.
Figure 11:
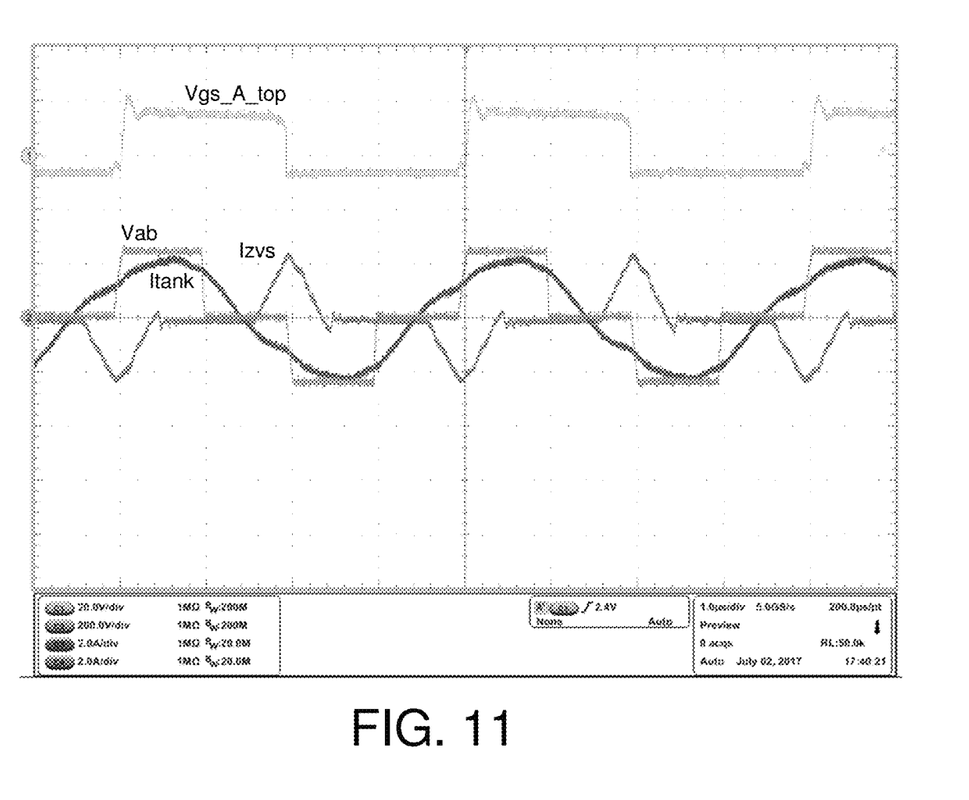
FIG. 11 is a circuit trace diagram of the converter running at 100% load with the ZVS assist circuit.

Hardware test results at ~50% load and full load are shown in FIGS. 10 and 11 where the SRC converter 600 is operated from a 1 amperes ("A") DC current source and its output is regulated at 0.33 A with 1 kilo Ohm ("kΩ") and 2 kΩ load resistance, respectively.

FIG. 10 is a circuit trace diagram of a converter 600 running at 50% load with a ZVS assist circuit 202 and FIG. 11 is a circuit trace diagram of the converter 600 running at 100% load with the ZVS assist circuit 202. In FIGS. 10 and 11, the top trace labeled Vgs_A_top (CH1) is the gate to source voltage for top MOSFET $Q_1$ in the first leg of the H-bridge circuit, the trace labeled Vab (CH2) is the primary side inverter voltage ($v_{AB}$), the waveform labeled Itank (CH3) is the current in the resonant tank ($i_{tank}$) and the current in the ZVS assisting branch ($i_{ZVS}$) is shown by the trace labeled $I_{ZVS}$ (CH4). From these results, it can be seen that at the positive rising edge of vas, the voltage waveform reaches $V_{in}$ before the gate of the top MOSFET $Q_1$ in the first leg of the switching leg is turned on confirming ZVS turn on.

Figure 12:
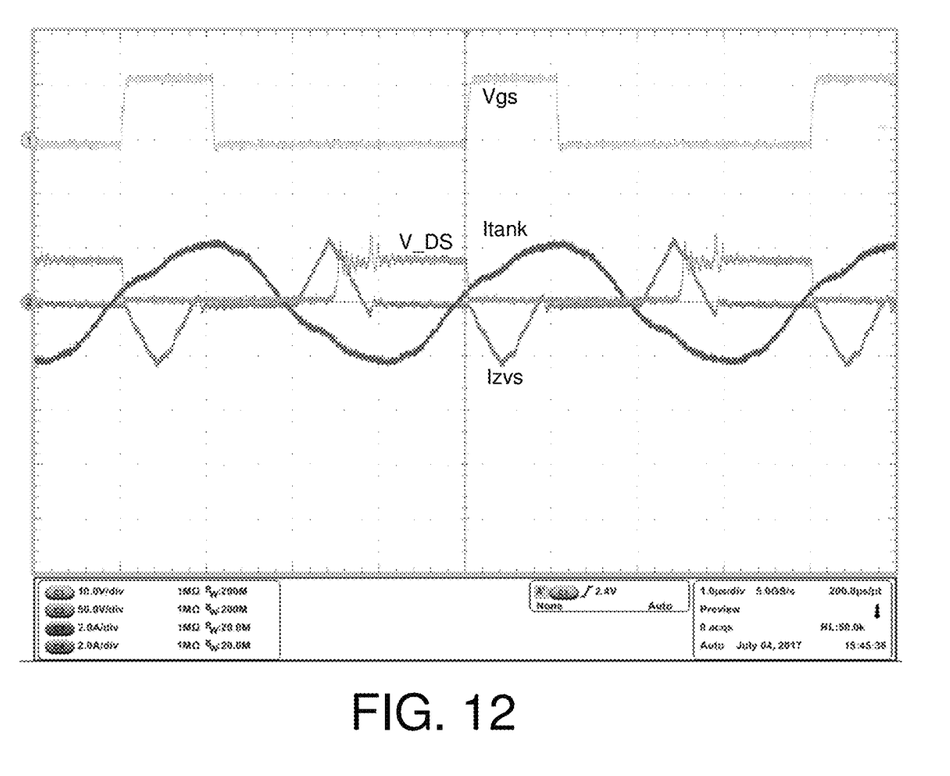
FIG. 12 is a circuit trace diagram of the converter running at 100% load with the ZVS assist circuit showing gate-to-source and drain-to-source voltages.

FIG. 12 is a circuit trace diagram of the converter 600 running at 100% load with the ZVS assist circuit 202 showing gate-to-source and drain-to-source voltages. In FIG. 12, the top trace labeled Vgs (CH1) is the gate to source voltage of auxiliary MOSFET $Q_{11}$, the trace labeled V_DS (CH2) is the voltage across drain to source of $Q_{11}$, the waveform labeled Itank (CH3) is the current in the resonant tank and the waveform labeled $I_{ZVS}$ (CH4) is the current in the ZVS assisting branch $I_{ZVS}$. It can be observed from FIG. 12, that the ZVS switches $Q_{11}$, $Q_{12}$ turn on and off at zero current and the auxiliary MOSFET $Q_{11}$ turns on with voltage across its drain to source of ~35 V while the $V_{in}$ at this operating condition is ~250 V, which results in lower turn on voltage across the auxiliary MOSFETs $Q_{11}$, $Q_{12}$ and hence lower dv/dt.

For a constant current input DC-DC SRC, achieving ZVS for the full load range is challenging to realize using passive techniques. Conventional active ZVS techniques either increase the rms current in the main and ZVS switches, leading to high conduction loss or have high voltage across the ZVS switches at turn on which results in high dv/dt and EMI.

A multi-winding transformer based ZVS assisting circuit 202 is proposed which has low rms current in the assisting branch as well as the main switching leg and at the same time lower voltage stress across the ZVS switches. The leakage inductance of the auxiliary transformer is utilized, in some embodiments, as the ZVS assisting inductor so that no additional inductor is needed. In other embodiments, a ZVS inductance $L_{ZVS}$ is included. Equivalent circuits of the ZVS assist circuit 202, during transition, is included in FIG. 9 along with calculations showing the desired rating of the components required to realize the proposed circuit. A hardware prototype has been built to test operation of the ZVS assist circuit 202 at different loads. The waveforms obtained from hardware testing verifies the proposed circuit operation. The proposed ZVS assist circuit 202 can be used in conjunction with any voltage fed half bridge switching leg to realize ZVS turn on of the switches $Q_1$, $Q_2$, but the ZVS assist circuit 202 may also be used for a second leg of an H-bridge circuit or for other converter topologies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a zero voltage switching ("ZVS") assist circuit connected between a switching node and a negative connection of a converter, the switching node between a first switch and a second switch of a switching leg of the converter, the converter fed by a constant current source and feeding a constant current load, the leg connected between a positive connection and the negative connection of the converter, the ZVS assist circuit comprising:
    a ZVS inductance;
    a first ZVS switch that allows current through the ZVS inductance of the ZVS assist circuit to change a voltage of the switching node to a condition for zero voltage switching of the first switch of the switching leg; and
    a second ZVS switch that allows current through the ZVS inductance of the ZVS assist circuit to change the voltage of the switching node to a condition for zero voltage switching of the second switch of the switching leg,
    wherein current through the first ZVS switch is opposite current through the second ZVS switch.

2. The apparatus of claim 1, further comprising a first ZVS diode in series with the first ZVS switch and a second ZVS diode in series with the second ZVS switch, wherein when current is flowing in the first ZVS switch, the second ZVS diode blocks current through the second ZVS switch and when current is flowing in the second ZVS switch, the first ZVS diode blocks current through the first ZVS switch and wherein the first ZVS diode and the second ZVS diode are connected to the ZVS inductance.

3. The apparatus of claim 2, further comprising a first snubber connected in parallel with the first ZVS diode and a second snubber connected in parallel with the second ZVS diode.

4. The apparatus of claim 1, further comprising a ZVS capacitor connected in series with the ZVS inductance in the ZVS assist circuit.

5. The apparatus of claim 1, wherein the ZVS assist circuit further comprises a transformer comprising a primary winding connected between the negative connection and the ZVS inductance and a secondary winding connected between the first ZVS switch and the second ZVS switch.

6. The apparatus of claim 5, wherein the first ZVS switch and the second ZVS switch are connected in series.

7. The apparatus of claim 5, wherein the first ZVS switch and the second ZVS switch are each connected to the negative connection.

8. The apparatus of claim 5, wherein the ZVS inductance comprises leakage inductance of the transformer.

9. The apparatus of claim 1, wherein the ZVS assist circuit further comprises a transformer comprising a primary winding connected between the negative connection and the ZVS inductance, a first secondary winding connected between the first ZVS switch and a first ZVS diode, the first ZVS switch and the first ZVS diode connected to the negative connection, and a second secondary winding connected between the second ZVS switch and a second ZVS diode, the second ZVS switch and the second ZVS diode connected to the negative connection.

10. The apparatus of claim 9, wherein the ZVS inductance comprises leakage inductance of the transformer.

11. The apparatus of claim 1, further comprising a ZVS controller that switches the first ZVS switch on prior to closing the first switch of the switching leg at a time sufficient for the voltage of the switching node to rise to a voltage sufficient for zero voltage switching when closing the first switch of the switching leg and that switches the second ZVS switch on prior to closing the second switch of the switching leg at a time sufficient for the voltage of the switching node to fall to a voltage sufficient for zero voltage switching when closing the second switch of the switching leg.

12. The apparatus of claim 1, wherein the ZVS inductance is sized based on an output capacitance of the first and second switches of the switching leg and an expected voltage from the positive connection to the negative connection.

13. The apparatus of claim 1, further comprising a first snubber connected in parallel with the first ZVS switch and a second snubber connected in parallel with the second ZVS switch.

14. A zero voltage switching ("ZVS") assist circuit comprising:
    a connection to a switching node and a connection to a negative connection of a converter, the switching node between a first switch and a second switch of a switching leg of the converter, the converter fed by a constant current source and feeding a constant current load, the leg connected between a positive connection and the negative connection of the converter;
    a ZVS inductance;
    a ZVS capacitor connected in series with the ZVS inductance;
    a first ZVS switch;
    a first ZVS diode in series with the first ZVS switch, wherein the first ZVS switch and first ZVS diode are connected and oriented to allow current through the ZVS inductance of the ZVS assist circuit to change a voltage of the switching node to a condition for zero voltage switching of the first switch of the switching leg;
    a second ZVS switch; and
    a second ZVS diode in series with the second ZVS switch, wherein the second ZVS switch and second ZVS diode are connected and oriented to allow current through the ZVS inductance of the ZVS assist circuit to change the voltage of the switching node to a condition for zero voltage switching of the second switch of the switching leg, wherein current through the first ZVS switch is opposite current through the second ZVS switch.

15. The ZVS assist circuit of claim 14, wherein the ZVS assist circuit further comprises a transformer comprising a primary winding connected between the negative connection and the ZVS inductance and a secondary winding connected between the first ZVS switch and the second ZVS switch, the first ZVS switch and the second ZVS switch are one of:
connected in series; and
each connected to the negative connection.

16. The ZVS assist circuit of claim 14, wherein the ZVS assist circuit further comprises a transformer comprising a primary winding connected between the negative connection and the ZVS inductance, a first secondary winding connected between the first ZVS switch and a first ZVS diode, the first ZVS switch and the first ZVS diode connected to the negative connection, and a second secondary winding connected between the second ZVS switch and a second ZVS diode, the second ZVS switch and the second ZVS diode connected to the negative connection.

17. A converter comprising:
a first leg of an H-bridge circuit, the first leg comprising a first switch and a second switch connected in series between a positive connection and a negative connection, wherein a connection between the first switch and the second switch comprise a first switching node;
a second leg of the H-bridge circuit, the second leg comprising a third switch and a fourth switch connected in series between a positive connection and a negative connection, wherein a connection between the third switch and the fourth switch comprise a second switching node;
a resonant section connected between the first switching node, the second switching node and a constant current-fed load, wherein a constant current source is connected between the positive connection and the negative connection;
a zero voltage switching ("ZVS") assist circuit connected between the first switching node and the negative connection, the ZVS assist circuit comprising:
a ZVS inductance;
a first ZVS switch that allows current through the ZVS inductance of the ZVS assist circuit to change a voltage of the first switching node to a condition for zero voltage switching of the first switch; and
a second ZVS switch that allows current through the ZVS inductance of the ZVS assist circuit to change the voltage of the first switching node to a condition for zero voltage switching of the second switch,
wherein current through the first ZVS switch is opposite current through the second ZVS switch.

18. The converter of claim 17, wherein the ZVS assist circuit further comprises a first ZVS diode in series with the first ZVS switch and a second ZVS diode in series with the second ZVS switch, wherein when current is flowing in the first ZVS switch, the second ZVS diode blocks current through the second ZVS switch and when current is flowing in the second ZVS switch, the first ZVS diode blocks current through the first ZVS switch and wherein the first ZVS diode and the second ZVS diode are connected to the ZVS inductance.

19. The converter of claim 17, wherein the ZVS assist circuit further comprises a ZVS capacitor connected in series with the ZVS inductance in the ZVS assist circuit.

20. The converter of claim 17, wherein the ZVS assist circuit comprises a first ZVS assist circuit and further comprising a second ZVS assist circuit connected between the second switching node and the negative connection.

\* \* \* \* \*